US006999882B2

(12) United States Patent

Frie et al.

(10) Patent No.: US 6,999,882 B2
(45) Date of Patent: Feb. 14, 2006

(54) METHOD FOR DETERMINING A MASS AIRFLOW

(75) Inventors: Werner Frie, Regensburg (DE); Christoph Haberer, Regensburg (DE); Harald Liederer, Woerth (DE)

(73) Assignee: Siemens Aktiengellschaft, Munich (DE)

( * ) Notice: Subject to any disclaimer, the term of this patent is extended or adjusted under 35 U.S.C. 154(b) by 37 days.

(21) Appl. No.: 10/627,992

(22) Filed: Jul. 28, 2003
(Under 37 CFR 1.47)

(65) Prior Publication Data

US 2004/0204871 A1 Oct. 14, 2004

(30) Foreign Application Priority Data

Jul. 29, 2002 (DE) ................................ 102 34 492

(51) Int. Cl.
*G01F 17/00* (2006.01)
*G01F 23/00* (2006.01)

(52) U.S. Cl. ........................................................ 702/50

(58) Field of Classification Search .................. 702/56, 702/127, 108, 113; 73/861.351, 116, 1.16, 73/118.2, 118.1
See application file for complete search history.

(56) References Cited

U.S. PATENT DOCUMENTS

| | | | | |
|---|---|---|---|---|
| 5,000,039 | A * | 3/1991 | Wright et al. | 73/118.2 |
| 5,629,481 | A * | 5/1997 | Sultan | 73/204.18 |
| 5,832,403 | A * | 11/1998 | Kowatari et al. | 701/103 |
| 6,370,935 | B1 * | 4/2002 | He et al. | 73/1.34 |
| 6,408,686 | B1 * | 6/2002 | Tallio et al. | 73/118.1 |
| 6,561,016 | B1 * | 5/2003 | Suhre et al. | 73/118.2 |

FOREIGN PATENT DOCUMENTS

DE 199 52 294 A1 9/2000

* cited by examiner

*Primary Examiner*—Michael Nghiem
*Assistant Examiner*—Demetrius Pretlow
(74) *Attorney, Agent, or Firm*—Morrison & Foerster LLP

(57) ABSTRACT

In a method for determining a mass airflow in an air duct using a mass airflow sensor, sensor signals at successive times, indicating the magnitude of the mass airflow, are captured and, using a characteristic curve for the mass airflow sensor, corresponding values are determined for the mass airflow. In doing so, a time series of signals is subjected to a vibration analysis, which determines a fundamental vibration and at least one prescribed harmonic vibration of the fundamental vibration, and the existence of a backflow is established if the ratio of the strength of the harmonic vibration to the strength of the fundamental vibration exceeds a prescribed threshold value.

14 Claims, 2 Drawing Sheets

METHOD FOR DETERMINING A MASS AIRFLOW

CLAIM FOR PRIORITY

This application claims priority to German Patent application 102 34 492.2, filed Jul. 29, 2002, which is hereby incorporated by reference.

TECHNICAL FIELD OF THE INVENTION

The present invention relates to a method for the determination of a mass airflow in an air duct using a mass airflow sensor, and to a mass airflow sensor unit with a mass airflow sensor.

BACKGROUND OF THE INVENTION

An important area of application for methods and mass airflow sensors is the measurement of mass airflows in the intake air ducts of modern internal combustion engines. Namely, precise control of the combustion in such internal combustion engines requires the amount of air drawn in through the intake air duct to be precisely measured, in order to maintain an optimal fuel-to-air ratio during combustion.

For the measurement of such a mass airflow, multiple heated wire or hot film mass airflow meters are used. The basis of the way in which these sensors work is that a mass airflow cools a heated body down to an extent which corresponds to the magnitude of the mass airflow around the body. Accordingly, a current flowing through a heating resistor is controlled to maintain the heating resistor at a constant temperature above the temperature of the mass airflow. The heating current required to achieve this represents a very exact, albeit non-linear, measure of the mass airflow.

Provided that the air in an intake air duct always flows in one direction only, these sensors work with adequate precision. However, with internal combustion engines, operating conditions can arise in which air in the intake air duct of the internal combustion engine is subject to pulsations. These pulsations can become so strong that a backflow of the air occurs, in the reverse of the normal intake direction. However, the measurement principles described above, using heated wire or hot film mass airflow meters, only permit the magnitude of a mass airflow to be determined, but not its direction. In the case of pulsations, this can lead to a backflow being measured as an inflow of intake air, which makes control of the internal combustion engine significantly more difficult.

One possible way of recognizing such backflows consists in the use of two sensors spaced apart in the direction of the flow, or one sensor with two sensory elements spaced apart in the direction of the flow, so that by comparing their values the presence of a backflow can be inferred. However, such arrangements have a comparatively complicated construction, and demand costly assembly in an intake air duct.

DE 43 42 481 C2 describes a method for the measurement of the air mass drawn into an internal combustion engine, using a temperature-sensitive measurement sensor in its intake air duct, whereby, from average load states of the internal combustion engine onwards, a supplementary heating element, located downstream from the measurement sensor in the induction direction, is heated up to produce an error-compensating effect on the measurement sensor. This method requires the additional installation of the supplementary heating element into the intake air duct, which increases the manufacturing costs.

SUMMARY OF THE INVENTION

On embodiment of the invention relates to a method for the determination of a mass airflow in an air duct using a mass airflow sensor, by means of which it is possible to capture signals, each of which corresponds to an amount of a value of the mass airflow, whereby sensor signals are captured and from them values are determined for the mass airflow using a characteristic curve. Another embodiment of the invention relates to a corresponding mass airflow sensor unit with a mass airflow sensor, using which it is possible to form a signal corresponding to a variable of a mass airflow in an air duct.

The invention provides a method for determining an airflow mass, and a corresponding mass airflow sensor of such a nature that a backflow of inducted air caused by pulsations can be reliably recognized.

In another embodiment of the invention, a time series of signals, which comprises several signals which have already been captured, is subject to a vibration analysis, which determines the fundamental vibration and at least one prescribed harmonic vibration of the fundamental vibration and compares parameters of the fundamental vibration and of the prescribed harmonic vibration, and establishes the existence of a backflow against the average mass airflow, due to pulsations, if the ratio of the parameters of the harmonic vibration to the fundamental vibration exceeds a prescribed threshold value.

The method in accordance with the invention can be used for any required mass airflow or gas flow sensors, the outputs from which indicate the magnitude, which in the context of the invention is taken to be a non-negative value, but not the direction of a mass airflow which is to be captured. In particular, these sensors could be heated wire or hot film sensors.

In order to recognize backflows, the method in accordance with the invention utilizes the property of the mass airflow sensors which leads to the problem in recognizing backflows, namely that the amount of the mass airflow is determined but not its direction.

To make it easier to understand, the mass airflow can be regarded as the overlaying of an average mass airflow and a vibration with a particular pulsation frequency, a particular level of modulation, which determines the amplitude, relative to the magnitude of the average mass airflow, of the vibration of the mass air flow about the average mass airflow, and with a negligible average value when determined over one period. For example, for a harmonic pulsatory vibration, the mass airflow Q can be expressed as a function of the time t, the pulsation frequency ω, the level of modulation m and the average mass airflow $Q_{av}$ as follows:

$$Q=Q_{av}\cdot(1+m\cdot\cos(\omega t)).$$

If the level of modulation is less than 100%, then no backflow will occur because the amplitude of the vibration always remains less than the average value of the mass airflow, and the resulting instantaneous mass airflow always remains positive. The sensor signals then correspond to the actual mass airflow, that is the overlaying of a constant and a vibration. A vibration analysis thus leads to the identification of the average mass airflow and the overlaid component at the pulsation frequency.

If the level of modulation is greater than 100%, however, a backflow occurs during those time intervals in which the instantaneous mass airflow values are negative. This is the case when the instantaneous excursion of the vibration is negative and its magnitude is greater than the negative of the average mass airflow. Then, however, the sensor signal is no longer in the form of a constant overlaid by an vibration, because during the intervals in which the backflow occurs what is captured in not a negative mass airflow but a positive mass airflow of the same magnitude, the size of this corresponding to that of the backflow. In the vibration analysis of the sensor signals there appear therefore, not only the fundamental vibrations corresponding to the pulsation frequency, but in addition harmonic frequencies which depend on the level of modulation of the pulsating mass airflow.

Hence, in order to determine a backflow, a vibration analysis is carried out on a time series comprising a prescribed number of signals captured before the most recent sensor signal. When used on internal combustion engines, it is preferable to use a multiple of a segment for which the fundamental modes of vibration are known. Ideally, the vibration analysis will be carried out in a control unit of an internal combustion engine, so that the fundamental frequency is known from its rotational speed. It is then only necessary to determine the harmonic vibrations.

The pulsation vibrations, or the corresponding graph of the sensor signal, are not necessarily sinusoidal or cosinusoidal, so that even with modulation levels below 100% harmonic vibrations may be established by the vibration analysis, but their strength is significantly less than the strength of the harmonic vibrations caused by backflows. For this reason, in order to detect the onset of a backflow, the harmonic vibration is compared against the fundamental vibration by reference to a suitable parameter. When this comparison is made, if the harmonic of the fundamental vibration exceeds a prescribed threshold value, a backflow is recognized. This threshold value will generally depend on the functional form of the time-dependent signal which underlies the vibration analysis. It can be determined, for example, by tests or, if for example the pulsations can be simulated with sufficient accuracy, by the application of appropriate simulation results.

The invention permits a backflow of air caused by pulsations to be recognized in a simple way, with no change to the mass airflow sensor. In particular, it is no longer necessary to use two mass airflow sensors or one mass airflow sensor with two sensory elements, spaced apart in the direction of the flow, or an additional heating element.

In order to enable the signals from a mass airflow sensor to be used even when a backflow is established, it is preferable that the value of the mass airflow corresponding to a most recent signal is corrected for the occurrence or backflows in the air duct when it has been established that a backflow exists. For this purpose, the value of the signal from the mass airflow sensor, or the value of the mass airflow determined from the characteristic curve, can for example be replaced by the corresponding value before the onset of the pulsation, or by values from a predefined family of correction curves. The latter could include, for example, as independent variables the average mass flow and the ratio of the magnitudes of the parameter for the harmonic vibration to the fundamental vibration. It is also possible to use as the mass airflow simply the mass airflow determined from the pulsation and to output a further signal which indicates the existence of pulsations.

In another embodiment of the invention, a value for the level of modulation of the pulsation is determined from the ratio of the parameters for the fundamental vibration and the harmonic vibration, and this value is used for correction purposes. In particular, it is then possible to use a model of the mass airflow in order to determine by approximation, from the average mass airflow and the level of modulation, the actual mass airflow, if necessary for a complete prescribed time interval.

Basically, the vibration analysis, for example in the form of a Fourier analysis or an analysis of the harmonics, can be performed using as the most recent signal each signal which is captured. In this case, the last signal in the time series can be at a time interval before the most recent signal, the interval being so chosen that the information for the vibration analysis can still be used for correcting the current signal. Here, the time interval can be chosen in particular as a function of the speed with which the pulsations which cause a backflow typically start up or die down, as a function of the speed with which the vibration analysis can be performed and, if a correction is to be carried out, as a function of the nature of the correction. However, the time series can include not only the prescribed number of signals captured before the most recent one, but in addition also the most recent signal value, which then represents the last signal value, so that the time interval is zero.

However, depending on the speed at which the mechanism for performing the vibration analysis works, the analysis may require a longer time than is available before the next signal is captured. Furthermore, the pulsations which cause a backflow will set in no faster than a predefined maximum speed which is determined by the finite propagation speed of airborne waves and depends on the conditions in the internal combustion engine, and die down with a corresponding maximum speed. It is therefore preferable to carry out the vibration analysis at prescribed time intervals which are larger than the time intervals between the capture of successive sensor signal values. The existence or non-existence of a backflow can then be extrapolated over the time period between successive vibration analyses. The time intervals at which vibration analyses are performed can then be made dependent, in particular, on the speed with which pulsations which produce a backflow typically set in or die down, and on the speed with which the vibration analysis can be performed. In the case of an internal combustion engine, the signals will preferably be processed segment-by-segment.

In the embodiment described, it is preferable that the values for the mass airflow are corrected in each case on the basis of the last vibration analysis. The intervals at which the vibration analyses are carried out can then also be made dependent, in particular, on the nature of the correction, in particular for the extrapolation error when a model of the pulsations is used.

The invention can be generally used for the determination of mass airflows in air ducts, in particular in the intake air ducts of internal combustion engines. Although pulsations can basically arise at any rotation speed of an internal combustion engine, they cause a backflow of the inducted air in particular operating conditions. It is therefore preferable that the air duct used for an internal combustion engine is the intake air duct, that at least one operating parameter of the internal combustion engine is captured, and that the vibration analysis is performed when the operating parameter which is captured lies within a prescribed range, in which pulsations of a prescribed minimum strength are expected. The prescribed range can then be made dependent, in particular, on the construction of the internal combustion engine and the intake air duct, or its resonant frequencies for air vibrations and the load state, as appropriate. The operating parameter could be, in particular, the rotational speed and, for Otto-cycle internal combustion engines, the throttle valve angle, which is one of the factors defining the load state. This method considerably reduces the effort required to determine a backflow which, particularly if the vibration analysis is performed in a control device for the internal combustion engine, can lead to a significant reduction in the load on any processor in it.

For the purpose of carrying out the vibration analysis, it is preferable, if the signals from the mass airflow sensor are not already digitized, to digitize them using for example an analog-to-digital converter, with a sampling frequency which is sufficiently high for the purposes of the vibration analysis. The vibration analysis can be performed on the basis of these digitized signal values, with any correction to the values of the mass airflow being effected by a correction of the signal values, which are then converted to mass airflow values which correspond to the characteristic curve. However, the characteristic curve for the mass airflow sensor is frequently non-linear, which makes the vibration analysis more difficult, because the peaks corresponding to the fundamental and harmonic vibrations are correspondingly broad. It is therefore preferable to determine values for a mass airflow variable from the signals by using the characteristic curve, and to perform the vibration analysis on the basis of a time series of mass airflow variable values which corresponds to the time series of the signals. If no backflow is present, the values of the mass airflow variables correspond to the mass airflow values. Otherwise, any correction of the values of the mass airflow variables to mass airflow values can then be made at the level of the mass airflows, and thus significantly more simply, because it is not necessary to take into account any non-linearity in the characteristic curve for the mass airflow sensor.

The parameters of the fundamental and harmonic vibrations can be determined, for example, using Laplace transforms or using wavelet analyses. Because of its simplicity, and particularly its speed of execution, it is preferable however to effect the vibration analysis by a Fourier analysis. It is particularly preferable to use a fast Fourier transform.

The parameters of the fundamental and harmonic vibrations can be defined in a variety of ways. Preferably, the strengths of the fundamental vibration and the harmonic vibration can be used in the form of the amplitudes of these vibrations, which are obtained directly from the vibration analysis.

If the phase and/or the amplitude information is used in the vibration analysis, a particularly accurate correction is obtained. The method is particularly sparing on computation if the phase angle between the $1^{st}$ and $2^{nd}$ harmonics is evaluated.

If, when the vibration analysis is carried out, the peaks of the fundamental and the harmonic vibrations are broad or indeed bell-shaped, the frequency corresponding to the peak is often difficult to determine, and with it the amplitude. It is then preferable to use the strengths of the fundamental vibration and the harmonic vibrations, and to determine them by reference to a power spectrum. In particular, the area under the peaks corresponding to the vibrations can be used as a measure of their strength, from which a very accurate determination of the strength of the corresponding vibration can be obtained. This can be an advantage particularly when non-harmonic vibrations are present.

The frequency of the fundamental vibration can basically be determined by the vibration analysis, but an extensive search may be necessary in order to do so. In order to speed up the search for the pulsation corresponding to the fundamental vibration in an internal combustion engine, it is preferable to use as the air duct the intake air duct in the internal combustion engine, to determine the rotational speed of the internal combustion engine, and to use a value for the rotational speed of the internal combustion engine in determining the fundamental vibration. For an internal combustion engine, the pulsation frequency is determined approximately primarily as the product of the rotational speed of the internal combustion engine and the number of its cylinders divided by the number of work cycles per revolution of the crankshaft. It is then possible to search within a prescribed range, around the pulsation frequency determined approximately in this way, for the actual pulsation frequency, which can significantly reduce the effort required for the search.

In order to obtain as accurate data as possible for a harmonic vibration, it is preferable to use the first harmonic vibration. This frequently has a greater strength than higher harmonics, so that noise effects induce smaller relative errors in the determination of the harmonic vibration and the ratio of the strength of the harmonic vibration to the fundamental vibration than if use is made of higher harmonic vibrations. If only the first harmonic vibration is used, the sampling frequency, at which the signals are captured from the mass airflow sensor, can also be chosen to be lower than if higher harmonic vibrations are used.

To permit any backflow to be more reliably established, or the mass airflow value to be corrected, as appropriate, it is preferable that the parameter for at least one further harmonic vibration is determined, and in addition the ratio of the fundamental vibration to this additional harmonic vibration and/or the ratio of the harmonic vibration to this additional harmonic vibration is used in establishing a backflow and/or for correction purposes. The use of additional harmonic vibrations can, in particular, permit better estimation of the level of modulation, and hence the magnitude of any backflow.

The invention can, for example, be carried out using a controller which controls the internal combustion engine, if this has an appropriately programmed processor. It is also possible to integrate an appropriate unit directly into a mass airflow sensor, which avoids wiring work.

In still another embodiment of the invention, there is a mass airflow sensor unit having a mass airflow sensor, with which a signal can be formed corresponding to a magnitude for a mass airflow in an air duct, the unit having an analysis device linked to the mass airflow sensor, this device being designed for converting the signal from the mass airflow sensor into the value of an output variable corresponding to a characteristic curve for the mass airflow sensor, which curve represents a relationship between the signal from the mass airflow sensor and corresponding magnitudes of the mass airflow, the device being designed to carry out the method in accordance with the invention.

In on aspect, the analysis device can have a memory and a digital signal processor linked to the memory, the processor being programmed to carry out the method in accordance with the invention.

To carry out the method, a mass airflow sensor unit in accordance with the invention can be implemented in the mass airflow sensor or in the controller for an internal combustion engine. In particular it can be manufactured as a module, and used for very varied controllers.

BRIEF DESCRIPTION OF THE DRAWINGS

The invention is explained in more detail below by reference to the drawings, in which.

DETAILED DESCRIPTION OF THE INVENTION

Figure 1:
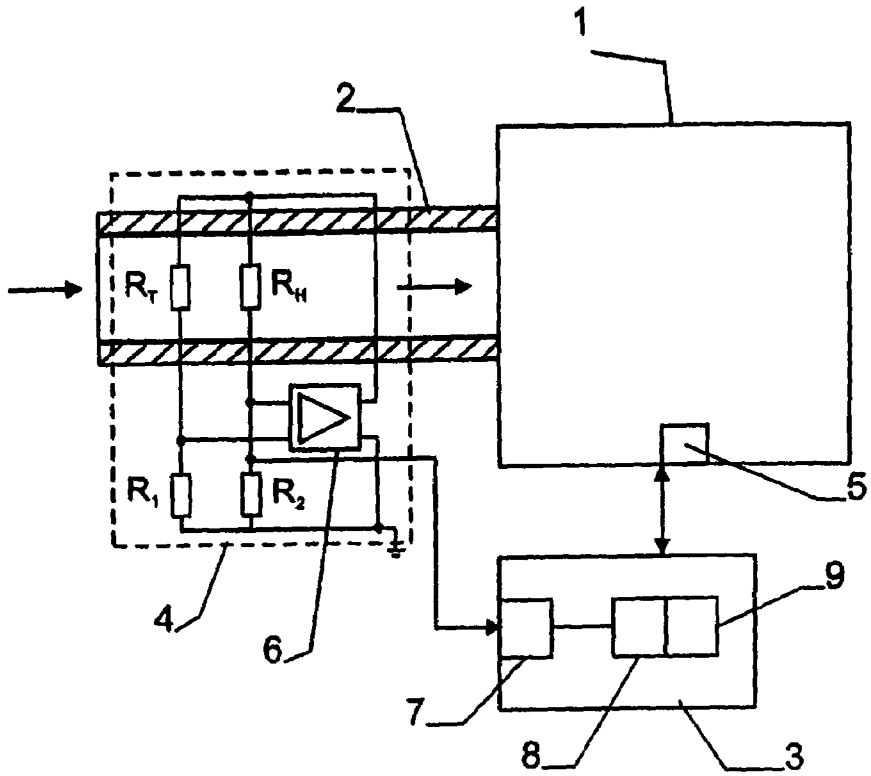
FIG. 1 shows an Otto motor with a controller and an intake air duct with a heated wire mass airflow sensor.

In FIG. 1, an Otto motor 1 is connected to an intake air duct 2, through which air is drawn into the Otto motor 1 for combustion. A controller 3 is connected to the Otto motor 1 to control it. In or on the intake air duct 2, as applicable, is arranged a heated wire mass airflow sensor 4, which is connected to the controller 3.

The Otto motor 1 is constructed in the familiar manner as a 4-stroke motor, and includes devices not explicitly shown in the schematic representation of FIG. 1, namely an air feed, fuel pumping system, and exhaust gas handling equipment. In particular it has actuators, not shown in FIG. 1, for controlling operating parameters such as, for example, the volume of air drawn in plus the timing and quantities of fuel fed in, together with sensors for capturing the values of operating parameters, of which only a rotation rate sensor 5 is shown in FIG. 1.

The rotation rate sensor 5, which comprises a differential magneto-resistive sensor and a toothed wheel connected to the crankshaft of the Otto motor 1, captures the rotation rate of the Otto motor 1 in the familiar manner, and outputs corresponding rotation rate signals to the controller 3.

The heated wire mass airflow sensor 4, which is only shown schematically but is in the familiar form, comprises a bridge circuit with a first and a second bridge arm together with a regulating system 6 with a difference amplifier.

The first bridge arm has a temperature-dependent resistance $R_T$ connected in series with a further resistance $R_1$. The second bridge arm comprises a temperature-dependent sensor-heating resistance $R_H$ together with a resistance $R_2$ connected in series with it.

The resistance $R_T$ and the sensor-heating resistance $R_H$ are so arranged in the intake air duct 2 that when the airflow in the intake air duct 2 is normal the resistor $R_T$ is located upstream of the sensor-heating resistor $R_H$.

The regulating system 6 is connected via its input to the tapping points, between the resistors $R_T$ and $R_1$ or between the sensor-heating resistor $R_H$ and the resistor $R_2$ respectively, and from its output it supplies current to the bridge circuit.

The resistor $R_T$ acts as a temperature sensor for the temperature of the intake air. The sensor-heating resistor $R_H$ serves to measure the mass airflow, in which function it utilizes the fact that the sensor-heating resistor $R_H$ is cooled by a mass airflow which is at a lower temperature than the sensor-heating resistor $R_H$, to an extent corresponding to the magnitude of the mass airflow, which in turn leads to a corresponding change in its resistance value.

The regulation system 6 regulates the current through the bridge arms as a function of the difference between the voltage tapped firstly from between the resistors $R_T$ and $R_1$ and secondly that tapped from between the sensor-heating resistor $R_H$ and the resistor $R_2$, and in particular regulates the current through the sensor-heating resistor $R_H$ in such a way that the sensor-heating resistor $R_H$ is maintained at a prescribed fixed temperature difference relative to the temperature of the intake air, as measured by the resistor $R_T$.

To achieve this, the current is changed in such a way that the cooling of the sensor-heating resistor $R_H$, caused by the mass airflow, is compensated by a corresponding change in the current through the bridge, and hence through the sensor-heating resistor $R_H$, so that the voltage difference at the input to the regulation system 6 is held constant.

Figure 2:
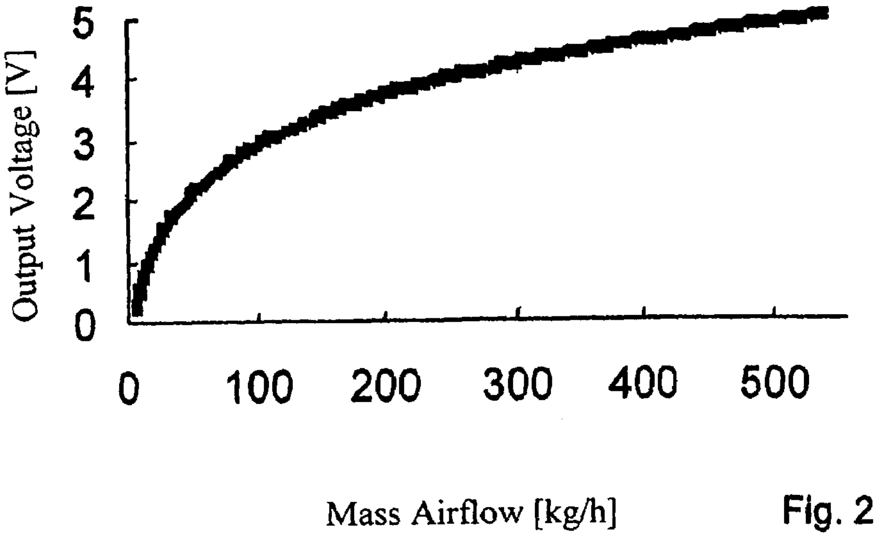
FIG. 2 shows a characteristic curve for the mass airflow sensor in FIG. 1.

A voltage tapped off at the resistor $R_2$, proportional to the current through the bridge circuit and hence corresponding to the mass airflow, forms a sensor output signal from the mass airflow sensor 4, which is fed to the controller 3. The sensor output signal from the mass airflow sensor 4 then corresponds to a mass airflow, in accordance with a characteristic curve as shown in FIG. 2, where this characteristic curve is dependent on the diameter of the intake air duct 2. Since the cooling of the sensor-heating resistor $R_H$ depends only on the magnitude of the mass airflow, it is not possible to determine the direction of the mass airflow using the heated wire mass airflow sensor 3.

The controller 3 comprises devices for capturing signals from sensors connected to the controller, of which the only one shown in FIG. 1 is an analog-to-digital converter 7 connected to the mass airflow sensor 4, output devices for activating the actuators in the Otto motor 1, a processor 8 connected to the capture devices and the output devices, plus a memory device 9 connected to the processor 8, for storing at least one program to be executed on the processor 8 together with data which may be required in the execution of the program, and also for permanent storage of the data for the characteristic curve.

The processor 8 uses, among other things, an appropriate control program to control the actuators for the Otto motor 1 as a function of the values captured from the sensors, and in particular also as a function of details of the mass airflow captured in the intake air duct 2. The processor 8 serves further to determine the mass airflow from the sensor output signals from the mass airflow sensor 4, for which purpose it executes an appropriate program, which may also be a part of the control program.

In order to capture details of the mass airflow, the analog signal from the mass airflow sensor 4 is sampled at a prescribed sampling frequency in the analog-to-digital converter 7 and is converted to a corresponding digital signal, which is fed to the processor 8 or the memory device 9, as applicable, and is stored in the memory device 9. In order to be able to capture, from the sensor output signal from the mass airflow sensor 4, at least the first harmonic vibration of a pulsation vibration, the sampling frequency will be greater than four times the highest pulsation frequency at which backflows can occur and which is to be taken into account, this frequency being given essentially by the product of the corresponding motor rotation speed and number of cylinders, divided by the number of work cycles per rotation of the crankshaft.

In doing this, the memory device 9 stores a prescribed number N of uninterrupted consecutive values of the digitized sensor output signal from the mass airflow sensor 4, corresponding to the time sequence in which they were captured, so that, when a newly-captured sensor signal value is saved, the oldest of the N values is deleted or overwritten.

In carrying out a vibration analysis, the existing time series consisting of the N saved values is then subjected to a fast Fourier transform (FFT) or another analytical procedure, and the results are saved in the memory device 9.

Figure 3:
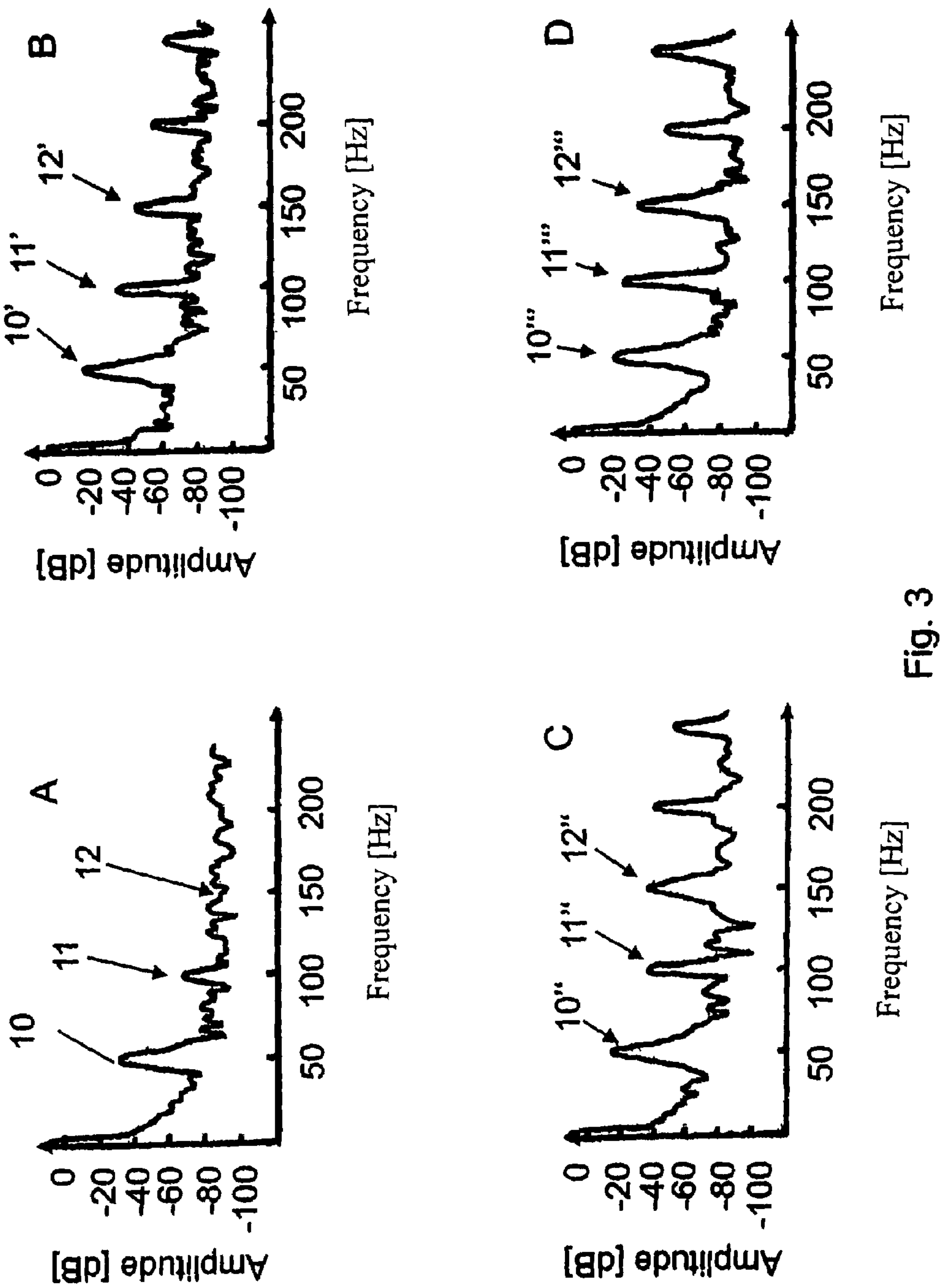
FIG. 3 illustrates four diagrams which show in graphic form a simulated frequency spectrum for pulsations, each with a different level of modulation.

Examples of the resulting spectra, with their points linked by a smooth curve to improve the presentation, are shown in diagrams A to D in FIG. 3, for modulation levels of 20% (i.e. 0.2), 100% (i.e. 1.0), 150% (i.e. 1.5), or 300% (i.e. 3.0), in each case for the same pulsation frequency and sampling frequency. Here, the ordinates are the values of the Fourier transforms in dB relative to a prescribed standard value. The ratios of the Fourier transforms or the corresponding differences in the logarithms of the ratios are necessary, and the magnitude of the standard value is of no importance, and is arbitrarily chosen.

The spectra show peaks 10, 10', 10" and 10'" for a fundamental vibration at the pulsation frequency. Further peaks which occur include 11, 11', 11" and 11'" for first harmonics at twice the pulsation frequency, and peaks 12, 12', 12" and 12'" for second harmonics at three times the pulsation frequency. Here, the ratios of the amplitudes of the harmonic vibrations to those of the fundamental vibrations clearly depend on the level of modulation: at a modulation level of 20% the difference between the amplitudes of the fundamental vibrations and the first harmonic vibrations amounts to some 40 dB (cf. diagram A) and then rises, when a modulation level of 100% is reached, at which a backflow starts to set in, to a difference of 20 dB (cf. diagram B), which is roughly the same as for a modulation level of 150% (cf. diagram C), to then reach some 5 dB at a modulation level of 300% (cf. diagram D).

Whereas, at a modulation level of 100%, the amplitudes of the first and the second harmonic vibration still differ by some 10 dB, at a modulation level of 150% they are of roughly the same size.

In order to determine the position of the peaks, the resulting spectrum is initially searched in the region of the expected pulsation frequency, given by the product of an engine rotation speed captured by the rotation speed sensor 5 and the number of cylinders divided by the number of working cycles per rotation of the crankshaft, to find a corresponding maximum in the spectrum.

If such a maximum is found, the value of the Fourier transforms is determined, and is saved together with the corresponding pulsation frequency.

After this, the values of the Fourier transforms at twice and three times the pulsation frequency are determined.

If the ratio of the amplitudes of the first harmonic vibration and the fundamental vibration exceeds a threshold value, which corresponds to −20 dB and thus amounts to about 0.01, the onset of a backflow is established.

If the existence of a backflow is established, the maxima of the sampled time-dependent digitized sensor output signal values from the mass airflow sensor 4 are used to determine corrected sensor output signal values. For this purpose, use is made of the fact that the digitized sensor output signal corresponds to the magnitude of the mass airflow which is now, over one full cycle of the pulsatory vibration, partly positive, i.e. moving in the direction toward the Otto motor 1, and partly negative, i.e. in the opposite direction. Here, the maximum with the lower value corresponds to precisely the minimum of the actual mass airflow.

After this, the mass airflow is determined from the value of the sensor output signal, corrected or uncorrected depending on the value of the modulation level, by reference to the characteristic curve for the mass airflow sensor 4 stored in the memory device 9 of the controller 3, and is then stored temporarily if necessary and then further used for the control of the Otto motor 1.

With a second exemplary embodiment, before the vibration analysis is carried out the digitized sensor output signal values undergo a conversion into mass airflow values, which then form the basis for the vibration analysis.

For this purpose, before they are saved the digitized sensor output signal values are first converted, using the characteristic curve for the mass airflow sensor 4 stored in the memory device 9, into values for a mass airflow variable which correspond to uncorrected mass airflow values, which are then saved in the same way as the digitized sensor output signal values in the first exemplary embodiment.

The vibration analysis is then carried out on the basis of the time series of values of the mass airflow variable, which corresponds to the time series in the first exemplary embodiment.

The resulting spectrum also shows peaks for a fundamental vibration and harmonic vibrations, corresponding to the pulsation vibration frequency. However, there are clear differences in the amplitudes of the corresponding peaks, determined by the elimination of the non-linearity arising from the non-linear characteristic curve. The threshold value for the ratio of the amplitudes of the first harmonic vibrations and the fundamental vibration must accordingly be set to an appropriate, different value.

If no backflow exists, the values of the mass airflow variables correspond to the actual magnitude of the mass airflow, and are used accordingly. Otherwise, any required correction is applied to the values of the mass airflow variables, to give actual mass airflow values at the level of the mass airflow values in a form corresponding to the first exemplary embodiment, and is thus simpler and more accurate to apply.

The mass airflow values determined can then, after temporary storage if necessary, be re-used for controlling the engine.

With a third exemplary embodiment, the components corresponding to the analog-to-digital converter 7, the processor 8 and the memory device 9, together with a mass airflow sensor corresponding to the mass airflow sensor 4, can be combined in one mass airflow sensor unit, which outputs to a controller mass airflow values determined by the processor.

What is claimed is:

1. A method for determining a mass airflow in an air duct, comprising:

providing a mass airflow sensor to capture signals, each of which corresponds to an amount of a value of the mass airflow, such that sensor signals are captured and values are determined for the mass airflow using a characteristic curve;

subjecting a time series of signals, which comprises several signals which have been captured, to a vibration analysis, which determines a fundamental vibration and at least one prescribed harmonic vibration of the fundamental vibration and compares parameters of the fundamental vibration and the prescribed harmonic vibration; and establishing a backflow against the average mass airflow, due to pulsations, when a ratio of the parameters of the harmonic vibration to the fundamental vibration exceeds a prescribed threshold value.

2. The method in accordance with claim 1, wherein the amplitude and/or phase angle is used as the parameter.

3. The method in accordance with claim 1, wherein the value of the mass airflow corresponding to a most recent captured signal is corrected for occurrence of backflows in the air duct when it has been established that a backflow exists.

4. The method in accordance with claim 1, further comprising determining a value for the level of modulation of the pulsation from the ratio of the parameters for the fundamental vibration and the harmonic vibration, and the value is used for correction.

5. The method in accordance with claim 1, wherein the vibration analysis is carried out at prescribed time intervals which are larger than the time intervals between the capture of successive sensor signal values.

6. The method in accordance with claim 5, wherein the correction of values for the mass airflow is made on based on one of the last vibration analyses.

7. The method in accordance with claim 1, further comprising providing an intake air duct of an internal combustion engine as the air duct, such that at least one operating parameter of the internal combustion engine is captured, and the vibration analysis is performed when the operating parameter which is captured lies within a prescribed range, in which pulsations of a prescribed minimum strength are expected.

8. The method in accordance with claim 1, wherein the values for a mass airflow variable are determined from the signals by using the characteristic curve for the mass airflow sensor, and the vibration analysis is performed based on a time series of mass airflow variable values which corresponds to the time series of the signals.

9. The method in accordance with claim 1, wherein the vibration analysis is carried out using a Fourier analysis.

10. The method in accordance with claim 1, wherein the parameters of the fundamental vibration and the harmonic vibration are determined using a power spectrum.

11. The method in accordance with claim 1, further comprising providing an intake air duct of an internal combustion engine as an air duct, such that a rotation speed is determined for the internal combustion engine, and in determining the fundamental vibration, the rotation speed of the internal combustion engine is used.

12. The method in accordance with claim 11, wherein the harmonic vibration used is the first harmonic vibration.

13. The method in accordance with claim 1, wherein the parameter for at least one additional harmonic vibration is determined, and in addition the ratio of the parameters for the fundamental vibration to the additional harmonic vibration and/or the ratio of the parameters for the harmonic vibration to the additional harmonic vibration is used in establishing a backflow and/or for correction purposes.

14. A mass airflow sensor unit, comprising:

a mass airflow sensor, with which a signal is formed corresponding to a magnitude for a mass airflow in an air duct; and an analysis device, linked to the mass airflow sensor, converts the signals from the mass airflow sensor into values for the mass airflow, wherein the mass airflow sensor unit captures signals, each of which corresponds to an amount of a value of the mass airflow, such that sensor signals are captured and values are determined for the mass airflow using a characteristic curve, subjecting a time series of signals, which comprises several signals which have been captured, to a vibration analysis, which determines a fundamental vibration and at least one prescribed harmonic vibration of the fundamental vibration and compares parameters of the fundamental vibration and the prescribed harmonic vibration, and establishing a backflow against the average mass airflow, due to pulsations, when a ratio of the parameters of the harmonic vibration to the fundamental vibration exceeds a prescribed threshold value.

* * * * *